US011513258B2

(12) United States Patent
Ogo et al.

(10) Patent No.: US 11,513,258 B2
(45) Date of Patent: Nov. 29, 2022

(54) SPECTACLE LENS AND SPECTACLES

(71) Applicants: HOYA LENS THAILAND LTD., Pathumthani (TH); JINS HOLDINGS INC., Maebashi (JP)

(72) Inventors: Yoichi Ogo, Tokyo (JP); Shunsuke Shioya, Maebashi (JP)

(73) Assignees: HOYA Lens Thailand Ltd., Patumthani (TH); JINS HOLDINGS INC., Maebashi (JP)

( * ) Notice: Subject to any disclaimer, the term of this patent is extended or adjusted under 35 U.S.C. 154(b) by 213 days.

(21) Appl. No.: 16/651,548

(22) PCT Filed: Sep. 28, 2018

(86) PCT No.: PCT/JP2018/036304
§ 371 (c)(1),
(2) Date: Mar. 27, 2020

(87) PCT Pub. No.: WO2019/065991
PCT Pub. Date: Apr. 4, 2019

(65) Prior Publication Data
US 2020/0264341 A1 Aug. 20, 2020

(30) Foreign Application Priority Data
Sep. 29, 2017 (JP) .............................. JP2017-191685

(51) Int. Cl.
G02C 7/10 (2006.01)
G02B 1/115 (2015.01)
G02B 1/14 (2015.01)
G02B 5/22 (2006.01)
G02B 5/26 (2006.01)
G02B 5/28 (2006.01)

(52) U.S. Cl.
CPC ............... *G02B 1/115* (2013.01); *G02B 1/14* (2015.01); *G02B 5/22* (2013.01); *G02B 5/26* (2013.01); *G02B 5/28* (2013.01); *G02C 7/107* (2013.01)

(58) Field of Classification Search
CPC . G02B 1/115; G02B 1/14; G02B 5/22; G02B 5/26; G02B 5/28; G02B 1/116; G02B 5/223; G02C 7/107; G02C 7/104; G02C 7/10; G02C 7/108
See application file for complete search history.

(56) References Cited

U.S. PATENT DOCUMENTS

| 6,531,221 B1 * | 3/2003 | Schuhmacher | ........ C09K 19/00 |
| | | | 428/402 |
| 2016/0215121 A1 | 7/2016 | Kousaka et al. | |
| 2016/0349537 A1 * | 12/2016 | Wu | .................. C23C 14/083 |
| 2017/0003520 A1 | 1/2017 | Iwasaki et al. | |
| 2017/0068114 A1 * | 3/2017 | Jaglan | ..................... G02B 5/285 |
| 2017/0097521 A1 * | 4/2017 | Yoshida | ................... G02C 7/107 |
| 2017/0219848 A1 * | 8/2017 | Kraus | ....................... G02C 7/10 |
| 2017/0235160 A1 * | 8/2017 | Larson | ................... G02C 7/104 |
| | | | 351/45 |

FOREIGN PATENT DOCUMENTS

| CN | 104903756 A | 9/2015 |
| CN | 106104312 A | 11/2016 |
| CN | 106916436 A | 7/2017 |
| CN | 107003545 A | 8/2017 |
| CN | 107077010 A | 8/2017 |
| EP | 1 170 602 A1 | 1/2002 |
| JP | 2013-008052 A | 1/2013 |
| WO | 02/14930 A1 | 2/2002 |
| WO | 2014/050930 A1 | 4/2014 |
| WO | 2015/046540 A1 | 4/2015 |
| WO | 2015/137282 A1 | 9/2015 |
| WO | 2016/060257 A1 | 4/2016 |
| WO | 2016/088763 A1 | 6/2016 |

OTHER PUBLICATIONS

Office Action dated Dec. 4, 2020, from The China National Intellectual Property English Administration in Chinese Application No. 201880062817.8.
Office Action dated May 17, 2021 issued in the corresponding Korean patent application No. 10-2020-7008815.
Office Action dated May 27, 2021 from the State Intellectual Property Office of P.R. of China in Chinese Machine Application No. 201880062817.8.
Extended European Search Report dated Aug. 4, 2021 from the European Patent Office in EP Application No. 18861306.1.
Office Action dated Aug. 24, 2021 from the China National Intellectual Property Administration in CN Application No. 201880062817. 8.
International Search Report dated Jan. 8, 2019 in International Application No. PCT/JP2018/036304.
Written Opinion of the International Searching Authority dated Jan. 8, 2019 in International Application No. PCT/JP2018/036304.
International Preliminary Report on Patentability dated Mar. 31, 2020 in International Application No. PCT/JP2018/036304.
Office Action dated Nov. 17, 2020 from the Japanese Patent Office in Japanese Application No. English 2017-191685.

* cited by examiner

*Primary Examiner* — Balram T Parbadia
(74) *Attorney, Agent, or Firm* — Sughrue Mion, PLLC

(57) ABSTRACT

Provided is a spectacle lens, having a lens substrate including a blue light absorbable compound, and a multilayer film including a chromium layer with a film thickness of 1.0 to 10.0 nm, blue light cut rate being 21.0% or more, a dominant wavelength measured at the object side surface of the spectacle lens falling within a range of 500.0 to 550.0 nm, and a dominant wavelength measured at the eyeball side surface of the spectacle lens falling within a range of 500.0 to 550.0 nm.

6 Claims, No Drawings

SPECTACLE LENS AND SPECTACLES

CROSS REFERENCE TO RELATED APPLICATIONS

This application is a National Stage of International Application No. PCT/JP2018/036304 filed Sep. 28, 2018, claiming priority to Japanese Patent Application No. 2017-191685 filed Sep. 29, 2017.

TECHNICAL FIELD

The present invention relates to a spectacle lens, and spectacles having the spectacle lenses.

BACKGROUND ART

The monitor screens of recent digital devices have changed from a Braun tube to liquid crystal. Recently, LED liquid crystal has also come into wide use. A liquid crystal monitor, particularly, a LED liquid crystal monitor intensely emits a short wavelength light called blue light. For this reason, in order to effectively reduce the eye fatigue and the eye pain caused upon using a digital device for a long time, measures for reducing the burden on the eyes due to blue light should be taken. In general, light within a wavelength region of 400 to 500 nm, or light in the vicinity of the wavelength region is called blue light.

Regarding the foregoing point, for example, PTL 1 proposes an optical article having a multilayer film having a property of reflecting light with a wavelength of 400 to 450 nm on the surface of a plastic substrate.

CITATION LIST

Patent Literature

[PTL 1] Japanese Patent Application Publication No. 2013-8052

SUMMARY OF INVENTION

Technical Problem

As a means for reducing the burden on the eyes due to blue light, the provision of a multilayer film having a property of reflecting blue light on the surface of the lens substrate as described in PTL 1 in a spectacle lens can be mentioned.

Meanwhile, a spectacle lens is also demanded to have good outward appearance. However, although the provision of a multilayer film having a property of intensely reflecting blue light on the surface of the lens substrate can reduce the light amount of the blue light made incident upon the eyes of a wearer via the spectacle lenses, the outward appearances of the spectacle lenses tend to largely vary from those of general spectacle lenses. Particularly, a spectacle lens including a multilayer film having a property of intensely reflecting blue light on the surface of the lens substrate intensely reflects blue light at the surface on the side thereof having the multilayer film. Accordingly, the outward appearance assumes a tincture of blue.

Under such circumstances, it is an object of one aspect of the present invention to provide a spectacle lens capable of reducing the burden on the eyes due to blue light, and having good outward appearance.

Solution to Problem

One aspect of the present invention is a spectacle lens, having:
a lens substrate including a blue light absorbable compound, and
a multilayer film including a chromium layer with a film thickness of 1.0 to 10.0 nm,
blue light cut rate being 21.0% or more,
a dominant wavelength measured at the object side surface of the spectacle lens falling within a range of 500.0 to 550.0 nm, and
a dominant wavelength measured at the eyeball side surface of the spectacle lens falling within a range of 500.0 to 550.0 nm.

The above spectacle lens is a spectacle lens in which the lens substrate includes a blue light absorbable compound. The blue light cut rate of the spectacle lens is 21.0% or more. A blue light can be blocked at such a high blue light cut rate. For this reason, by the above spectacle lens, it is possible to reduce the light amount of the blue light made incident upon the eyes of a wearer of spectacles having the spectacle lenses to reduce the burden on the eyes of the wearer due to blue light.

Further, the above spectacle lens has a multilayer film including a chromium layer with a film thickness of 1.0 to 10.0 nm. Chromium (Cr) has a property of absorbing not only light within the wavelength region of blue light but also light within a wide wavelength region of the visible region such as green light and/or red light. When blue light is selectively and intensely reflected by a multilayer film, the outward appearance of the spectacle lens becomes different from that of a general spectacle lens. In contrast, inclusion of a chromium layer as one layer of the multilayer film can achieve a spectacle lens assuming the outward appearance similar to that of a general spectacle lens. Particularly, in the above spectacle lens, the dominant wavelengths respectively measured at the object side surface and the eyeball side surface fall within a range of 500.0 to 550.0 nm of the wavelength region of green light. Most of currently widely used general spectacle lenses assume the similar dominant wavelengths at both surfaces of respective spectacle lenses. For this reason, the above spectacle lens can assume the outward appearance similar to that of a general spectacle lens.

Further, chromium is a metal. For this reason, when a chromium layer is formed into a thick film, the transmittance (e.g., luminous transmittance) of the spectacle lens can be largely reduced. Whereas, with a chromium layer having a film thickness of 1.0 to 10.0 nm, the transmittance of the spectacle lens can be prevented from being largely reduced.

A further aspect of the present invention relates to spectacles having the above spectacle lenses.

Effects of Invention

According to one aspect of the present invention, it is possible to provide a spectacle lens capable of reducing the burden on the eyes due to blue light, and assuming the outward appearance similar to that of a general spectacle lens, and spectacles having the above spectacle lenses.

DESCRIPTION OF EMBODIMENTS

Spectacle Lens

A spectacle lens according to one aspect of the present invention is a spectacle lens having a lens substrate including blue light absorbable compound, and a multilayer film including a chromium layer with a film thickness of 1.0 to 10.0 nm, blue light cut rate being 21.0% or more, a dominant wavelength measured at the object side surface of the spectacle lens falling within a range of 500.0 to 550.0 nm, and a dominant wavelength measured at the eyeball side surface of the spectacle lens falling within a range of 500.0 to 550.0 nm.

The definition of the terms and/or the measuring method in the present invention and the present description will be described below.

The "object side surface" is the surface situated on the object side when a wearer wears spectacles having spectacle lenses, and the "eyeball side surface" is the surface situated opposite thereto, namely, on the eyeball side when a wearer wears spectacles having spectacle lenses. As for the surface shape, in one embodiment, the object side surface is a convex surface, and the eyeball side surface is a concave surface. However, this embodiment is not exclusive.

The "blue light absorbable compound" denotes a compound having an absorption in the wavelength region of 400 to 500 nm.

The "blue light cut rate" is determined by the following Equation 1 according to the standards of the Japan Medical-Optical Equipment Industrial Association.

Blue light cut rate $C_b = 1 - \tau_b$ (Equation 1)

In the Equation 1, $\tau_b$ is the weighted transmittance of blue light detrimental to the eyes stipulated in the standards of the Japan Medical-Optical Equipment Industrial Association, and is calculated by the following Equation 2. In the Equation 2, WB($\lambda$) is a weighting function, and is calculated by the following Equation 3. The $\tau(\lambda)$ is the transmittance at a wavelength of $\lambda$nm measured by a spectrophotometer. Therefore, for the blue light cut rate $C_b$, the cut rate of blue light due to absorption and the cut rate of blue light due to reflection are added.

$$\tau_b = \frac{\int_{380\,nm}^{500\,nm} \tau(\lambda) \cdot WB(\lambda) \cdot d\lambda}{\int_{380\,nm}^{500\,nm} WB(\lambda) \cdot d\lambda} \quad \text{(Equation 2)}$$

$$WB(\lambda) = E_{S\lambda}(\lambda) \cdot B(\lambda) \quad \text{(Equation 3)}$$

In the Equation 3, the $E_{s\lambda}(\lambda)$ is the spectral irradiance of sunlight, and the B($\lambda$) is blue light hazard function. The $E_{s\lambda}(\lambda)$, the B ($\lambda$), and the WB ($\lambda$) are described in JIS T 7333 Annex C. When the value is calculated using the $E_{s\lambda}(\lambda)$, the B ($\lambda$), and the WB ($\lambda$), the measurement by a spectrophotometer is assumed to be performed at a measurement wavelength interval (pitch) of 1 to 5 nm, and at least a wavelength from 380 to 500 nm.

The "dominant wavelength" is an index obtained by converting the wavelength of the color of the light felt by human eyes into numerical values, and is measured according to JIS Z 8701.

The "luminous reflectance" described later is measured according to JIS T 7334:2011, and the "luminous transmittance" is measured according to JIS T 7333:2005.

The average reflectance in the wavelength region of a wavelength of 400 to 500 nm measured at the object side surface of the spectacle lens described later is the average reflectance with respect to the light vertically incident from the object side surface (i.e., the angle of incidence is 0°), and is the arithmetic average of the values of reflectance measured in the wavelength region of a wavelength of 400 to 500 nm using a spectrophotometer from the object side of the spectacle lens. The average reflectance in the wavelength region of a wavelength of 400 to 500 nm measured at the eyeball side surface of the spectacle lens described later is the average reflectance with respect to the light vertically incident from the eyeball side surface, and is the arithmetic average of the values of reflectance measured in the wavelength region of a wavelength of 400 to 500 nm using a spectrophotometer from the eyeball side of the spectacle lens. For the measurement, the measurement wavelength interval (pitch) can be arbitrarily set. For example, the measurement wavelength interval (pitch) can be set within a range of 1 to 5 nm. In the following description, the average reflectance in the wavelength region of a wavelength of 400 to 500 nm is also described as a "blue light reflectance".

In the present invention and the present description, the "film thickness" is a physical film thickness. The film thickness can be determined by a known film thickness measuring method. For example, the film thickness can be determined by converting the optical film thickness measured by an optical film thickness measuring device into the physical film thickness.

Below, the above spectacle lens will be described in further detail.

Blue Light Cut Rate

The blue light cut rate of the above spectacle lens is 21.0% or more. According to the spectacle lens with blue light cut rate of 21.0% or more, a wearer wears spectacles having the spectacle lenses, which can reduce the light amount of the blue light incident upon the eyes of the wearer, and can reduce the burden on the eyes of the wearer due to the blue light. The blue light cut rate is preferably 21.5% or more, more preferably 22.0% or more, further preferably 22.5% or more, still further preferably 23.0% or more, still further more preferably 23.5% or more, and still furthermore preferably 24.0% or more. Further, the blue light cut rate can be, for example, 50.0% or less, 40.0% or less, or 30.0% or less. However, from the viewpoint of reducing the light amount of the blue light incident upon the eyes of the wearer, a higher blue light cut rate is more preferable, and hence the blue light cut rate can exceed the upper limit exemplified in the above description.

Dominant Wavelength

In the above spectacle lens, the dominant wavelengths respectively measured at the object side surface and the eyeball side surface fall within a range of 500.0 to 550.0 nm. 500.0 to 550.0 nm falls within the wavelength region of green light. For this reason, the spectacle lens having dominant wavelengths within the wavelength region of 500.0 to 550.0 nm at both the surfaces can assume a green interference color when observed from any surface side. A general spectacle lens has an antireflection film. A general antireflection film is designed so as to assume a green interference color which is less likely to feel strange for human eyes. Therefore, the spectacle lens having the wavelengths measured at both surfaces thereof within a range of 500.0 to 550.0 nm can assume the outward appearance similar to that of a general spectacle lens. It is sufficient for the dominant wavelength measured at each surface of the spectacle lens to fall within a range of 500.0 to 550.0 mm. In one embodiment, the dominant wavelength measured at each surface of the spectacle lens can be, for example, 510.0 nm or more. Further, in another embodiment, the dominant wavelength measured at each surface of the spectacle lens can also be, for example, 540.0 nm or less.

The spectacle lens has blue light cut rate of 21.0% or more and the dominant wavelengths respectively measured at both the surfaces thereof fall within a range of 500.0 to 550.0 nm. To this, the inclusion of blue light absorbable compound in the lens substrate, and inclusion of a multilayer film including a chromium layer in the above spectacle lens as one layer of the multilayer film can contribute. The lens substrate and the multilayer film will be described in detail later.

Lens Substrate

The lens substrate included in the above spectacle lens has no particular restriction so long as it includes a blue light absorbable compound. The lens substrate can be a plastic lens substrate or a glass lens substrate. The glass lens substrate can be, for example, a lens substrate made of inorganic glass. As the lens substrate, a plastic lens substrate is preferable from the viewpoint of being lightweight, and being less likely to be broken, and tending to be easily doped with a blue light absorbable compound. The plastic lens substrate can be made of styrene resin such as (meth)acrylic resin, polycarbonate resin, allyl resin, allyl carbonate resin such as diethylene glycol bis (allyl carbonate) resin (CR-39), vinyl resin, polyester resin, polyether resin, urethane resin obtained through the reaction between an isocyanate compound and a hydroxy compound such as diethylene glycol, thiourethane resin obtained through the reaction between an isocyanate compound and a polythiol compound, and a cured product (generally called a transparent resin) obtained by curing a curable composition containing a (thio) epoxy compound having one or more disulfide bonds in the molecule. The curable composition can also be referred to as a polymerizable composition. As the lens substrate, an undyed lens substrate (colorless lens) can be used, or a dyed lens substrate (dyed lens) can be used. The refractive index of the lens substrate can be, for example, about 1.60 to 1.75. However, the refractive index of the lens substrate is not limited to the above range, and can fall within the above range, or can be above or below the above range. In the present invention and the present description, the refractive index denotes the refractive index with respect to light with a wavelength of 500 nm. Further, the lens substrate can be a lens with a refractive power (so-called prescription lens), or can be a lens without a refractive power (so-called non-prescription lens).

The above spectacle lenses can be various lenses such as a unifocal lens, a multifocal lens, and a progressive power lens. The kind of the lens is determined by the surface shape of each opposite surface of the lens substrate. Further, the lens substrate surface can be any of the convex surface, the concave surface, and the plane. For general lens substrate and spectacle lens, the object side surface is a convex surface, and the eyeball side surface is a concave surface. However, the present invention is not limited thereto.

Blue Light Absorbable Compound

The above lens substrate includes a blue light absorbable compound. This is one of the reasons why the above spectacle lens can have blue light cut rate of 21.0% or more. Examples of the blue light absorbable compounds can include various compounds having an absorption in the wavelength region of blue light such as a benzotriazole compound, a benzophenone compound, a triazine compound, and an indole compound. As preferable blue light absorbable compounds, a benzotriazole compound and an indole compound can be exemplified. As more preferable blue light absorbable compound, a benzotriazole compound can be exemplified. The benzotriazole compound is preferably the benzotriazole compound represented by the following formula (1).

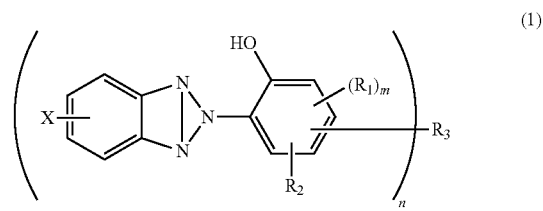

In the formula (1), X represents a group imparting the resonance effect. The substitution site of X is preferably the 5 site of the triazole ring.

Examples of X can include chlorine atom, bromine atom, fluorine atom, iodine atom, sulfo group, carboxy group, nitrile group, alkoxy group, hydroxy group, and amino group. Among these, chlorine atom, bromine atom, and fluorine atom are preferable, and chlorine atom is more preferable.

In the formula (1), $R_2$ represents an alkyl group having 1 to 12 carbon atoms or an alkoxy group having 1 to 12 carbon atoms. Each of the alkyl group and the alkoxy group can preferably have 1 to 8, more preferably 2 to 8, and further preferably 4 to 8 carbon atoms.

The alkyl group and the alkoxy group can be branched, or can be straight-chain. Among the alkyl group and the alkoxy group, the alkyl group is preferable.

Examples of the alkyl group can include a methyl group, an ethyl group, a n-propyl group, an iso-propyl group, a n-butyl group, a sec-butyl group, a tert-butyl group, a pentyl group, a hexyl group, a heptyl group, a n-octyl group, a 1,1,3,3-tetramethylbutyl group, a nonyl group, a decyl group, an undecyl group, and a dodecyl group. Among these, at least one selected from a n-propyl group, an iso-propyl group, a n-butyl group, a sec-butyl group, a tert-butyl group, and a 1,1,3,3-tetramethylbutyl group is preferable. N-butyl, sec-butyl, tert-butyl, and 1,1,3,3-tetramethylbutyl groups are more preferable, and a tert-butyl group is further preferable.

Examples of the alkoxy group can include a methoxy group, an ethoxy group, a propoxy group, a butoxy group, a pentyloxy group, a hexyloxy group, a heptyloxy group, an octyloxy group, a nonyloxy group, a decyloxy group, an undecyloxy group, and a dodecyloxy group. Among these, a butoxy group or an ethoxy group is preferable.

In the formula (1), the substitution site of $R_2$ is preferably the 3 site, the 4 site, or the 5 site based on the substitution site of a benzotriazolyl group.

In the formula (1), $R_1$ represents an alkyl group having 1 to 3 carbon atoms or an alkoxy group having 1 to 3 carbon atoms. Specific examples thereof can include those having the corresponding number of carbon atoms of the examples mentioned for $R_2$. Among these, a methyl group or an ethyl group is preferable.

In the formula (1), m represents an integer of 0 or 1.

In the formula (1), the substitution site of $R_2$ is preferably the 5 site based on the substitution site of a benzotriazolyl group.

n represents the valence of $R_3$, and is 1 or 2.

In the formula (1), $R_3$ represents a hydrogen atom, or a bivalent hydrocarbon group having 1 to 8 carbon atoms. When n is 1, $R_3$ represents a hydrogen atom. When n is 2, $R_3$ represents a bivalent hydrocarbon group having 1 to 8 carbon atoms.

Examples of the hydrocarbon group represented by $R_3$ can include an aliphatic hydrocarbon group, or an aromatic hydrocarbon group. The number of carbon atoms of the hydrocarbon group represented by $R_3$ is 1 to 8, and is preferably 1 to 3.

Examples of the bivalent hydrocarbon group represented by $R_3$ can include a methanediyl group, an ethanediyl group, a propanediyl group, a benzenediyl group, and a toluenediyl group. Among these, a methanediyl group is preferable.

In the formula (1), the substitution site of $R_3$ is preferably the 3 site based on the substitution site of a benzotriazolyl group.

$R_3$ is preferably a hydrogen atom. In this case, n is 1.

The benzotriazole compound is preferably the benzotriazole compound represented by the following formula (1-1).

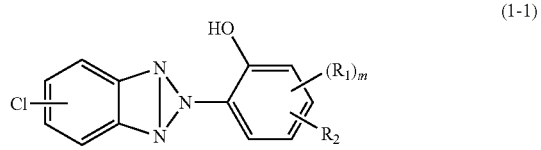

(1-1)

In the formula (1-1), $R_1$, $R_2$, and m are defined as the same as described above, respectively, and examples and preferable embodiments thereof are also the same as those described above.

Specific examples of the benzotriazole compound represented by the formula (1) can include: methylenebis[3-(5-chloro-2-benzotriazolyl)-5-(1,1,3,3-tetramethylbutyl)-2-hydroxyphenyl], methylenebis[3-(5-chloro-2-benzotriazolyl)-5-(tert-butyl)-2-hydroxyphenyl], methylenebis[3-(5-chloro-2-benzotriazolyl)-5-tert-butyl-2-hydroxyphenyl], methylenebis[3-(5-chloro-2-benzotriazolyl)-5-tert-butyl-2-hydroxyphenyl], methylenebis[3-(5-chloro-2-benzotriazolyl)-5-ethoxy-2-hydroxyphenyl], phenylenebis[3-(5-chloro-2-benzotriazolyl)-5-(1,1,3,3-tetramethylbutyl)-2-hydroxyphenyl], and the following specific examples of the benzotriazole compound represented by the formula (1-1).

Specific examples of the benzotriazole compound represented by the formula (1-1) can include 2-(3-tert-butyl-2-hydroxy-5-methyl phenyl)-5-chloro-2H-benzotriazole, 2-(3-tert-butyl-2-hydroxy-5-ethylphenyl)-5-chloro-2H-benzotriazole, 5-chloro-2-(3,5-dimethyl-2-hydroxyphenyl)-2H-benzotriazole, 5-chloro-2-(3,5-diethyl-2-hydroxyphenyl)-2H-benzotriazole, 5-chloro-2-(2-hydroxy-4-methoxyphenyl)-2H-benzotriazole, 5-chloro-2-(4-ethoxy-2-hydroxyphenyl)-2H-benzotriazole, 2-(4-butoxy-2-hydroxyphenyl)-5-chloro-2H-benzotriazole, and 5-chloro-2-(2-hydroxy-4-octyloxyphenyl)-2H-benzotriazole.

Among the above compounds, 2-(3-tert-butyl-2-hydroxy-5-methyl phenyl)-5-chloro-2H-benzotriazole, 2-(3-tert-butyl-2-hydroxy-5-ethylphenyl)-5-chloro-2H-benzotriazole, 5-chloro-2-(4-ethoxy-2-hydroxyphenyl)-2H-benzotriazole, and 2-(4-butoxy-2-hydroxyphenyl)-5-chloro-2H-benzotriazole are preferable.

The above lens substrate can include a blue light absorbable compound, for example, in an amount of 0.05 to 3.00 parts by mass relative to 100 parts by mass of a resin forming the lens substrate (or a polymerizable compound for obtaining the resin), includes preferably in an amount of 0.05 to 2.50 parts by mass, includes more preferably in an amount of 0.10 to 2.00 parts by mass, and includes further preferably in an amount of 0.30 to 2.00 parts by mass. However, it is sufficient that the blue light cut rate of the spectacle lens can be set at 21.0% or more. For this reason, the content within the above range is not exclusive. As the method for manufacturing a lens substrate including a blue light absorbable compound, a known method can be used. For example, with a method for obtaining a lens substrate as a formed product in a lens shape by curing a curable composition, by adding a blue light absorbable compound to the curable composition, it is possible to obtain a lens substrate including a blue light absorbable compound. Alternatively, with various wet or dry methods generally for use as the dyeing method of a lens substrate, blue light absorbable dye can be introduced into the lens substrate. For example, as one example of the wet methods, a dip method (immersion method) can be exemplified. As one example of the dry methods, a sublimation dyeing method can be exemplified.

Further, the above lens substrate can include various additives which can be generally included in the lens substrate of a spectacle lens. For example, when the lens substrate is formed by curing a curable composition including a polymerizable compound and a blue light absorbable compound, to such a curable composition, there can be added the polymerization catalysts described in, for example, Japanese Patent Application Publication No. H7-063902, Japanese Patent Application Publication No. H7-104101, Japanese Patent Application Publication No. H9-208621, and Japanese Patent Application Publication No. H9-255781, and one or more of the additives such as an internal mold-releasing agent, an antioxidant, a fluorescent brightening agent, and a blueing agent described in Japanese Patent Application Publication No. H1-163012, Japanese Patent Application Publication No. H3-281312, and the like. To the kind and the addition amount of the additives, and the forming method of the lens substrate using a curable composition, a known technology is applicable.

Multilayer Film

The above spectacle lens has a multilayer film including a chromium layer with a film thickness of 1.0 to 10.0 nm. Below, the multilayer film including a chromium layer with a film thickness of 1.0 to 10.0 nm is also described as a "chromium layer-containing multilayer film", and each of other multilayer films than this is also described as "the other multilayer film".

The chromium layer-containing multilayer film can be situated on the object side surface of the spectacle lens, can also be situated on the eyeball side surface, and can also be situated on both the surfaces. Further, in one embodiment, on one surface of the eyeball side surface and the object side surface of the spectacle lens, the chromium layer-containing multilayer film can be situated, and the other multilayer film can be situated on the other surface. In another embodiment, the following configuration is also possible: on one surface of the eyeball side surface and the object side surface of the spectacle lens, the chromium layer-containing multilayer film is situated, and on the other surface, neither chromium layer-containing multilayer film nor the other multilayer film is situated. In a further embodiment, the chromium layer-containing multilayer film can be situated at least on the object side surface of the spectacle lens, and can also be situated only on the object side surface. Either of the chromium layer-containing multilayer film and the other multilayer film can be situated directly on the surface of the lens substrate, and can also be situated indirectly on the surface of the lens substrate via one or more layers of other layers. Examples of the layer which can be formed between the lens substrate and the multilayer film can include a polarization layer, a photochromic layer, and a hard coat layer. Provision of a hard coat layer can enhance the durability (strength) of the spectacle lens. The hard coat layer can be, for example, a cured layer obtained by curing a curable composition. For the details of the hard coat layer, reference can be made to, for example, paragraphs [0025] to [0028], and [0030] of Japanese Patent Application Publication No. 2012-128135. Further, between the lens substrate and the multilayer film, a primer layer for improving the adhesion can be formed. For the details of the primer layer, reference can be made to, for example, paragraphs [0029] to [0030] of Japanese Patent Application Publication No. 2012-128135.

Chromium Layer-Containing Multilayer Film

In the present invention and the present description, the "chromium layer" means the film formed by depositing chromium (Cr) by any deposition method, and is a film including chromium (elemental chromium, namely, metallic chromium) other than impurities inevitably mixed during deposition and known additives to be arbitrarily used for supporting deposition. For example, the chromium layer is the film occupied by chromium in an amount of 90 mass % to 100 mass % based on the mass of the film, and can also be the film occupied by chromium in an amount of 95 mass % to 100 mass %. As the deposition method, a known deposition method can be used. From the viewpoint of easiness of deposition, deposition is preferably performed by vapor deposition. Namely, the chromium layer is preferably a chromium vapor deposition film. The vapor deposition film means the film deposited by vapor deposition. The "vapor deposition" in the present invention and the present description includes a dry method such as a vacuum vapor deposition method, an ion plating method, or a sputtering method. With the vacuum vapor deposition method, an ion beam assist method in which an ion beam is simultaneously applied during vapor deposition can be used. The above matters are also true of the following deposition of a high refractive index layer and a low refractive index layer.

The chromium layer included in the chromium layer-containing multilayer film has a film thickness of 1.0 to 10.0 nm. Below, the chromium layer with a film thickness of 1.0 to 10.0 nm will be also simply described as a chromium layer. From the viewpoint of the transmittance (e.g., luminous transmittance) of the spectacle lens, the film thickness of the chromium layer is preferably 9.0 nm or less, more preferably 8.0 nm or less, further preferably 7.0 nm or less, still further preferably 6.0 nm or less, still more further preferably 5.0 nm or less, furthermore preferably 4.0 nm or less, and still much more preferably 3.0 nm or less. Further, the film thickness of the chromium layer is 1.0 nm or more and preferably 1.1 nm or more from the viewpoint of the absorption efficiency of lights with various wavelengths such as blue light by the chromium layer. The chromium layer-containing multilayer film preferably includes only one layer of the chromium layer with a film thickness of 1.0 to 10.0 nm. However, in one embodiment, the chromium layer can also be divided into two or more layers, and another layer can be present between the divided layers. In this case, the total film thickness of the chromium layer divided into two or more layers is 1.0 to 10.0 nm.

The chromium layer-containing multilayer film is preferably a multilayer film including a chromium layer in a multilayer film including high refractive index layer(s) and low refractive index layer(s) alternately stacked therein. In the present invention and the present description, the "high" and the "low" for the "high refractive index" and the "low refractive index" are relative expressions. Namely, the high refractive index layer denotes the layer with a higher refractive index than that of the low refractive index layer included in the same multilayer film. In other words, the low refractive index layer denotes the layer with a lower refractive index than that of the high refractive index layer included in the same multilayer film. The refractive index of the high refractive index material forming the high refractive index layer falls within a range of, for example, 1.60 or more (e.g., the range of 1.60 to 2.40), and the refractive index of the low refractive index material forming the low refractive index layer can fall within a range of, for example, 1.59 or less (e.g., the range of 1.37 to 1.59). However, as described above, the expressions of the "high" and the "low" for the high refractive index and the low refractive index are relative. For this reason, the refractive indices of the high refractive index material and the low refractive index material are not limited to the above range.

As the high refractive index material and the low refractive index material, inorganic materials, organic materials, or organic/inorganic composite materials can be used. From the viewpoint of the film-forming property and the like, inorganic materials are preferable. Namely, the chromium layer-containing multilayer film is preferably an inorganic multilayer film. Specifically, as the high refractive index materials for forming the high refractive index layer, examples can include one or two or more mixtures of oxides selected from the group consisting of zirconium oxide (e.g., $ZrO_2$), tantalum oxide ($Ta_2O_5$), titanium oxide (e.g., $TiO_2$), aluminum oxide ($Al_2O_3$), yttrium oxide (e.g., $Y_2O_3$), hafnium oxide (e.g., $HfO_2$), and niobium oxide (e.g., $Nb_2O_5$). On the other hand, as the low refractive index materials for forming the low refractive index layer, examples can include one or two or more mixtures of oxides or fluorides selected from the group consisting of silicon oxide (e.g., $SiO_2$), magnesium fluoride (e.g., $MgF_2$), and barium fluoride (e.g., $BaF_2$). In the above examples, for convenience, the oxides and the fluorides are expressed in stoichiometric composition. However, those in an oxygen or fluorine deficient or excessive state from the stoichiometric composition are also usable as the high refractive index materials or the low refractive index material.

Preferably, the high refractive index layer is a film including a high refractive index material as a main component, and the low refractive index layer is a film including a low refractive index material as the main component. Herein, the main component is the component accounting for the most part of the film, and is a component generally accounting for about 50 mass % to 100 mass %, or further accounting for about 90 mass % to 100 mass %. By forming a film using a film-forming material (e.g., vapor deposition source) including the high refractive index material or the low refractive index material as the main component, it is possible to form such a film (e.g., a vapor deposition film). The same as that described above also applies to the main component for the film-forming material. The film and the film-forming material can include impurities inevitably mixed therein. Further, there can be included other components such as other inorganic substances, and known additive components playing the role of supporting film formation within the range not impairing the functions accomplished by the main component. Film formation can be performed by a known film-forming method, and is preferably performed by vapor deposition from the viewpoint of the easiness of film formation.

The film thicknesses of the high refractive index layer and the film thickness of the low refractive index layer can be determined according to the layer configuration. Particularly, the combination of the layers included in the multilayer film, and the film thickness of each layer can be determined by optical simulation by a known method based on the refractive index of the film-forming material for forming the high refractive index layer and the low refractive index layer, and desired reflection characteristics and transmission characteristics which are desired to be imparted to the spectacle lens by provision of the multilayer film.

As the layer configurations of the chromium layer-containing multilayer film, for example, the following layer configurations, from the lens substrate side toward the lens outermost surface side, can be exemplified:

a configuration stacked in the order of first layer (high refractive index layer)/second layer (chromium layer)/third layer (low refractive index layer)/fourth layer (high refractive index layer)/fifth layer (low refractive index layer);

first layer (low refractive index layer)/second layer (high refractive index layer)/third layer (low refractive index layer)/fourth layer (high refractive index layer)/fifth layer (chromium layer)/sixth layer (low refractive index layer)/seventh layer (high refractive index layer)/eighth layer (low refractive index layer), and the like.

In the above examples of the layer configuration, the expression "/" is used to include the case where the layer described at the left of "/" and the layer described at the right thereof are adjacent to each other, and the case where a conductive oxide layer described later is present between the layer described at the left of "/" and the layer described at the right thereof.

As one preferable example of the combination of the low refractive index layer and the high refractive index layer included in the chromium-containing multilayer film, a combination of a film including silicon oxide as the main component (low refractive index layer) and a film including zirconium oxide as the main component (high refractive index layer) can be exemplified.

The chromium layer-containing multilayer film can also include, in addition to the chromium layer, the high refractive index layer, and the low refractive index layer described above, one or more layers of a layer including a conductive oxide as the main component (conductive oxide layer), preferably a vapor deposition film of a conductive oxide formed by vapor deposition using a vapor deposition source including a conductive oxide as the main component at any position of the multilayer film. This point is also true of the other multilayer film. The same also applies to the main components described for the conductive oxide layer.

The conductive oxide layers are preferably, from the viewpoint of the transparency of the spectacle lens, a indium tin oxide (tin-doped indium oxide; ITO) layer with a film thickness of 10.0 nm or less, a tin oxide layer with a film thickness of 10.0 nm or less, and a titanium oxide layer with a film thickness of 10.0 nm or less. The indium tin oxide (ITO) layer is a layer including ITO as the main component. This point is also true of a tin oxide layer, and a titanium oxide layer. The chromium layer-containing multilayer film and the other multilayer film can include a conductive oxide layer to prevent the following: a spectacle lens is charged, so that dust and dirt are deposited thereon. In the present invention and the present description, as the "high refractive index layer" and the "low refractive index layer" included in the chromium layer-containing multilayer film and the other multilayer film, a indium tin oxide (ITO) layer with a film thickness of 10.0 nm or less, a tin oxide layer with a film thickness of 10.0 nm or less, and a titanium oxide layer with a film thickness of 10.0 nm or less are not considered. Namely, even when one or more layers of the layers are included in the chromium layer-containing multilayer film or the other multilayer film, the layers are not regarded as the "high refractive index layer" or the "low refractive index layer". The film thickness of the conductive oxide layer with a film thickness of 10.0 nm or less can be, for example, 0.1 nm or more.

Other Multilayer Film

When the spectacle lens has a chromium layer-containing multilayer film on one surface of the object side surface and the eyeball side surface, and has the other multilayer film on the other surface, as the other multilayer film, a multilayer film generally provided as an antireflection film in a spectacle lens is preferably formed. As the antireflection film, a multilayer film exhibiting an antireflective effect with respect to a visible light (light of a wavelength region of 380 to 780 nm) can be exemplified. The configuration of such a multilayer film is known. Further, the other multilayer film can be, for example, an inorganic multilayer film. The other multilayer film can be, for example, a multilayer film including a total of 3 to 10 layers of the high refractive index layers and the low refractive index layers stacked alternately. The details of the high refractive index layer and the low refractive index layer are as described above. Preferable one example of the combination of the low refractive index layer and the high refractive index layer included in the other multilayer film can include the combination of a film including silicon oxide as the main component (low refractive index layer) and a film including zirconium oxide as the main component (high refractive index layer).

Further, on the chromium layer-containing multilayer film and/or on the other multilayer film, a further functional film can also be formed. As such functional films, various functional films such as water-repellent or hydrophilic antifouling film, and antifogging film can be exemplified. To any of the functional films, a known technology is applicable.

Reflection Characteristics and Transmission Characteristics of Spectacle Lens

Blue Light Reflectance

As described above, when a multilayer film having a property of intensely reflecting blue light is provided on the surface of the lens substrate, the outward appearance of the spectacle lens surface on the side having the multilayer film assumes a tincture of blue. In contrast, the above spectacle lens includes a blue light absorbable compound in the lens substrate and has the chromium layer-containing multilayer film described above, and thereby can achieve blue light cut rate of 21.0% or more without being required to be increased in blue light reflectance at the spectacle lens surface. In the above spectacle lens, at least one (preferably both) of the blue light reflectance measured at the object side surface of the spectacle lens and the blue light reflectance measured at the eyeball side surface is preferably 2.00% or less, more preferably less than 2.00%, further preferably 1.50% or less, and still further preferably 1.00% or less. The blue light reflectance can be, for example, 0.10% or more, and can also be less than this.

Luminous Reflectance

From the viewpoint of the improvement of the outward appearance quality of the spectacle lens, the luminous reflectance measured at the object side surface of the spectacle lens is preferably low. Further, from the viewpoint of the improvement of the wearing feeling of the spectacle lens, the luminous reflectance measured at the eyeball side surface of the spectacle lens is preferably low. From the improvement of the outward appearance quality, the luminous reflectance measured at the object side surface of the spectacle lens is preferably 1.80% or less, more preferably 1.50% or less, and still more preferably 1.30% or less. On the other hand, from the viewpoint of the improvement of the wearing feeling, the luminous reflectance measured at the eyeball side surface of the spectacle lens is preferably 1.80% or less, more preferably 1.50% or less, and still more preferably 1.30% or less.

The luminous reflectance measured at the object side surface of the spectacle lens, and the luminous reflectance measured at the eyeball side surface can be respectively, for example, 0.10% or more, 0.20% or more, 0.30% or more, 0.40% or more, or 0.50% or more. However, the lower limits are illustrative, but not exclusive. The luminous reflectance can be implemented by the film design of the chromium layer-containing multilayer film or the other multilayer film provided on the object side surface and/or on the eyeball side surface of the lens substrate. The film design can be performed by optical simulation by a known method.

Luminous Transmittance

The above spectacle lens can be, in one embodiment, a spectacle lens having a high luminous transmittance, and excellent transparency. The luminous transmittance of the spectacle lens is preferably 80.0% or more, and more preferably 85.0% or more. Further, the luminous transmittance of the above spectacle lens is, for example, 95.0% or less, and can also be 90.0% or less. By forming the chromium layer included in the chromium layer-containing multilayer film into a thin film (particularly, a film thickness of 1.0 to 10.0 nm), it is possible to implement the blue light cut rate and dominant wavelength described above without largely reducing the luminous transmittance.

Spectacles

A further aspect of the present invention relates to spectacles having a spectacle lenses according to one aspect of the present invention. The details of the spectacle lenses included in the above spectacles are as described abo e. The above spectacle lenses include such spectacle lenses, and thereby can reduce the burden on the eyes of the spectacles wearer due to blue light. Further, the above spectacles have a dominant wavelength measured at each opposite surface of the spectacle lens falling within a range of 500 to 550 nm, and hence can assume a green interference color as with general spectacle lenses. The configuration of the spectacles such as the frame has no particular restriction, and a known technology is applicable thereto.

EXAMPLES

The present invention will be further described below by way of Examples. The present invention is, however, not limited to the embodiments shown in Examples.

Example 1

(1) Manufacturing of Lens Substrate (Lens Substrate A) Including Blue Light Absorbable Compound 100.00 parts by mass of bis-(β-epithiopropyl)sulfide, and 0.40 part by mass of 2-(3-tertbutyl-2-hydroxy-5-methyl phenyl)-5-chloro-2H-benzotriazole of blue light absorbable compound were mixed with stirring. Then, as a catalyst, 0.05 part by mass of tetra-n-butyl phosphonium bromide was added. The resulting mixture was mixed with stirring under reduced pressure of 10 mmHg for 3 minutes. As a result, a monomer composition (curable composition) for lens was prepared. Then, the monomer composition for lens was introduced into a lens forming die (set at 0.00 D, lens thickness 2.0 mm) including a mold made of glass and a gasket made of a resin previously prepared, and polymerization was performed in an electric furnace at a furnace temperature of 20° C. to 100° C. for 20 hours. After completion of polymerization, the gasket and the mold were removed. Then, a heat treatment was performed at 110° C. for 1 hour, resulting in a plastic lens (lens substrate A). For the resulting lens substrate A, the object side surface was a convex surface, and the eyeball side surface was a concave surface. The refractive index was 1.60.

(2) Formation of Multilayer Film

Both surfaces of the lens substrate A were optically processed (polished) to be optical surfaces. Then, on both the surfaces, hard coat layers (cured layers obtained by curing a curable composition) with a film thickness of 3000 nm were formed, respectively.

On the hard coat layer surface on the object side and on the hard coat layer surface on the eyeball side, multilayer vapor deposition films with respective configurations shown in Table 1 (Table 1-1 and Table 1-2) were formed respectively by ion assist vapor deposition using an oxygen gas and a nitrogen gas as an assist gas.

In this manner, a spectacle lens of Example 1 having the chromium layer-containing multilayer film on the object side, and having the other multilayer film (not including a chromium layer) on the eyeball side was obtained.

In the present Example, both on the convex surface side and on the concave surface side, each multilayer vapor deposition film was formed so as to be stacked from the lens substrate side (hard coat layer side) toward the surface side of the spectacle lens in the order of 1st layer, 2nd layer, and the like, and so that the outermost layer on the spectacle lens surface side became the layer described in the lowermost column in Table 1. Further, in the present Example, film formation was performed using a vapor deposition source (depositing material) consisting of, except for the impurities which can be inevitably mixed therein, oxide shown in Table 1 or chromium. The refractive index of each oxide and the film thickness of each layer are shown in Table 1. The points are also true of Examples and Comparative Examples described later.

Example 2

Both surfaces of the lens substrate A were optically processed (polished) to be optical surfaces. Then, on both the surfaces, hard coat layers (cured layers obtained by curing a curable composition) with a film thickness of 3000 nm were formed, respectively.

On the hard coat layer surface on the object side and on the hard coat layer surface on the eyeball side, multilayer vapor deposition films with their respective configurations shown in Table 2 (Table 2-1 and Table 2-2) were formed respectively by ion assist vapor deposition using an oxygen gas and a nitrogen gas as an assist gas.

In this manner, a spectacle lens of Example 2 having the chromium layer-containing multilayer film on the object side, and having the other multilayer film (not including a chromium layer) on the eyeball side was obtained.

Comparative Example 1

Both surfaces of the lens substrate A were optically processed (polished) to be optical surfaces. Then, on both the surfaces, hard coat layers (cured layers obtained by curing a curable composition) with a film thickness of 3000 nm were formed, respectively.

On the hard coat layer surface on the object side and on the hard coat layer surface on the eyeball side, multilayer vapor deposition films with their respective configurations shown in Table 3 were formed respectively by ion assist vapor deposition using an oxygen gas and a nitrogen gas as an assist gas.

In this manner, a spectacle lens of Comparative Example 1 having the other multilayer films (not including a chromium layer) on the object side, and on the eyeball side was obtained.

Comparative Example 2

Both surfaces of the lens substrate A were optically processed (polished) to be optical surfaces. Then, on both the surfaces, hard coat layers (cured layers obtained by curing a curable composition) with a film thickness of 3000 nm were formed, respectively.

On the hard coat layer surface on the object side and on the hard coat layer surface on the eyeball side, multilayer vapor deposition films with their respective configurations shown in Table 4 were formed respectively by ion assist vapor deposition using an oxygen gas and a nitrogen gas as an assist gas.

In this manner, a spectacle lens of Comparative Example 2 having the other multilayer films (not including a chromium layer) on the object side, and on the eyeball side was obtained.

Each film thickness described in Table 1 to Table 4 is the value (unit: nm) determined by converting the optical film thickness measured by an optical film thickness measuring device into a physical film thickness. The thickness of each layer was controlled by the film formation time.

TABLE 1

| | Film-forming material | Refractive index (500 nm) | Ex. 1 Object side |
|---|---|---|---|
| 1st layer | $SiO_2$ | 1.46 | 31.6 |
| 2nd layer | $ZrO_2$ | 2.09 | 7.2 |
| 3rd layer | $SiO_2$ | 1.46 | 157.7 |
| 4th layer | $ZrO_2$ | 2.09 | 25.4 |
| 5th layer | Cr | | 1.2 |
| 6th layer | $SiO_2$ | 1.46 | 22.5 |
| 7th layer | $ZrO_2$ | 2.09 | 48.8 |
| 8th layer | $SiO_2$ | 1.46 | 98.6 |

| | Film-forming material | Refractive index (500 nm) | Ex. 1 Eyeball side |
|---|---|---|---|
| 1st layer | $SiO_2$ | 1.46 | 28.1 |
| 2nd layer | $ZrO_2$ | 2.09 | 6.2 |
| 3rd layer | $SiO_2$ | 1.46 | 173.3 |
| 4th layer | $ZrO_2$ | 2.09 | 30.0 |
| 5th layer | $SiO_2$ | 1.46 | 27.1 |
| 6th layer | $ZrO_2$ | 2.09 | 49.1 |
| 7th layer | $SiO_2$ | 1.46 | 95.6 |

TABLE 2

| | Film-forming material | Refractive index (500 nm) | Ex. 2 Object side |
|---|---|---|---|
| 1st layer | $ZrO_2$ | 2.09 | 30.9 |
| 2nd layer | Cr | | 1.2 |
| 3rd layer | $SiO_2$ | 1.46 | 9.4 |
| 4th layer | $ZrO_2$ | 2.09 | 76.3 |
| 5th layer | $SiO_2$ | 1.46 | 90.5 |

| | Film-forming material | Refractive index (500 nm) | Ex. 2 Eyeball side |
|---|---|---|---|
| 1 layer | $ZrO_2$ | 2.09 | 25.8 |
| 2 layer | $SiO_2$ | 1.46 | 13.4 |
| 3 layer | $ZrO_2$ | 2.09 | 88.5 |
| 4 layer | $SiO_2$ | 1.46 | 85.6 |

TABLE 3

| | | | Comp. Ex. 1 | |
|---|---|---|---|---|
| | Film-forming material | Refractive index (500 nm) | Object side | Eyeball side |
| 1 layer | $SiO_2$ | 1.46 | 178.7 | 178.7 |
| 2 layer | $ZrO_2$ | 2.09 | 18.5 | 18.5 |
| 3 layer | $SiO_2$ | 1.46 | 30.9 | 30.9 |
| 4 layer | $ZrO_2$ | 2.09 | 91.4 | 91.4 |
| 5 layer | $SiO_2$ | 1.46 | 98.8 | 98.8 |

TABLE 4

| | | | Comp. Ex. 2 | |
|---|---|---|---|---|
| | Film-forming material | Refractive index (500 nm) | Object side | Eyeball side |
| 1st layer | $SiO_2$ | 1.46 | 16.5 | 16.6 |
| 2nd layer | $ZrO_2$ | 2.09 | 5.8 | 5.8 |
| 3rd layer | $SiO_2$ | 1.46 | 174.9 | 178.4 |
| 4th layer | $ZrO_2$ | 2.09 | 28.7 | 28.7 |
| 5th layer | $SiO_2$ | 1.46 | 27.4 | 27.8 |
| 6th layer | $ZrO_2$ | 2.09 | 48.2 | 48.6 |
| 7th layer | $SiO_2$ | 1.46 | 92.7 | 93.9 |

EVALUATION METHOD

1. Blue Light Cut Rate and Luminous Transmittance of Spectacle Lenses

The vertical incident transmittance spectral characteristics of each spectacle lens of Examples and Comparative Examples were measured by making light incident upon the optical center of the object side surface from the object-side surface side (convex surface side) of the spectacle lens at a pitch of 1 nm at a wavelength of from 380 nm to 780 nm using a spectrophotometer U4100 manufactured by Hitachi Ltd.

Using the measurement results, the blue light cut rate and the luminous transmittance were determined by the method described above.

2. Blue Light Reflectance and Luminous Reflectance Measured at Object Side Surface and Eyeball Side Surface of Spectacle Lens The vertical incident reflection spectral characteristics at the optical center on the object side surface (convex surface side) were measured from the object side of each spectacle lens of Examples and Comparative Examples.

Using the measurement results, the blue light reflectance and the luminous reflectance at the object side surface within the wavelength region of 400 to 500 nm were determined by the method described above.

Further, the vertical incident reflection spectral characteristics at the optical center of the eyeball side surface (concave surface side) were measured from the eyeball side of each spectacle lens of Examples and Comparative Examples.

Using the measurement results, the blue light reflectance and the luminous reflectance at the eyeball side surface within the wavelength region of 400 to 500 nm were respectively determined by the method described above.

The measurement was performed using a lens reflectance measuring device USPM-RU manufactured by Olympus Corporation (measurement pitch: 1 nm).

3. Dominant Wavelength

Using the measurement results of the vertical incident reflection spectral characteristics obtained for the object side surface of the spectral lens in the 2., the dominant wavelength measured at the object side surface of the spectacle lens was determined according to JIS Z 8701.

Further, using the measurement results of the vertical incident reflection spectral characteristics obtained for the eyeball side surface of the spectral lens in the 2., the dominant wavelength measured at the eyeball side surface of the spectacle lens was determined according to JIS Z 8701.

4. Interference Color

Each spectacle lens of Examples and Comparative Examples was visually observed from the object side (convex surface side) of the spectacle lens by an observer, thereby confirming the interference color.

The results thus obtained are shown in Table 5.

TABLE 5

|  |  | Ex. 1 | Ex. 2 | Comp. Ex. 1 | Comp. Ex. 2 |
|---|---|---|---|---|---|
| Blue light absorbable compound in lens substrate | | Contained | Contained | Contained | Contained |
| Chromium layer-containing multilayer film | | Present | Present | Not present | Not present |
| Dominant wavelength | Object side | 523.3 nm | 533.2 nm | 468.3 nm | 541.1 nm |
|  | Eyeball side | 520.6 nm | 518.4 nm | 467.9 nm | 546.2 nm |
| Blue light cut rate | | 25.1% | 25.1% | 23.5% | 20.2% |
| Luminous reflectance | Object side | 0.69% | 0.76% | 0.52% | 0.59% |
|  | Eyeball side | 0.60% | 0.54% | 0.75% | 0.56% |
| Blue light reflectance | Object side | 0.65% | 0.97% | 3.59% | 0.35% |
|  | Eyeball side | 0.63% | 0.59% | 5.16% | 0.37% |
| Luminous transmittance | | 88.8% | 88.2% | 94.4% | 93.0% |
| Interference color | | Green | Green | Blue | Green |

Finally, respective aspects described above will be summarized.

According to one aspect, there is provided a spectacle lens, having a lens substrate including a blue light absorbable compound, and a multilayer film including a chromium layer with a film thickness of 1.0 to 10.0 nm, blue light cut rate being 21.0% or more, a dominant wavelength measured at the object side surface of the spectacle lens falling within a range of 500.0 to 550.0 nm, and a dominant wavelength measured at the eyeball side surface of the spectacle lens falling within a range of 500.0 to 550.0 nm.

The above spectacle lens can reduce the burden on the eyes due to blue light, and can assume the outward appearance similar to that of a general spectacle lens.

In one embodiment, in the above spectacle lens, multilayer films are situated on the object side surface and on the eyeball side surface of the lens substrate, and the multilayer film containing a chromium layer is the multilayer film situated on the object side surface of the lens substrate.

According to another aspect, spectacles including the above spectacle lenses are provided.

Two or more of various embodiments described in the present description can be combined in any combination.

It should be considered that all the embodiments disclosed this time are exemplifications in all respects and are not restrictive ones. It is intended that the scope of the present invention is shown not by the above explanations but by claims, and that all changes in equivalent meanings and ranges to the scope of the claims are included.

INDUSTRIAL APPLICABILITY

The present invention is useful in the manufacturing fields of spectacle lenses and spectacles.

The invention claimed is:
1. A spectacle lens,
which comprises:
a lens substrate comprising a blue light absorbable compound, and a multilayer film comprising a chromium layer with a film thickness of 1.0 to 10.0 nm,
wherein
blue light cut rate is 21.0% or more,
a dominant wavelength measured at an object side surface of the spectacle lens falls within a range of 500.0 to 550.0 nm, and
a dominant wavelength measured at an eyeball side surface of the spectacle lens falls within a range of 500.0 to 550.0 nm.

2. The spectacle lens according to claim 1,
wherein multilayer films are situated on an object side surface and on an eyeball side surface of the lens substrate, and the multilayer film comprising a chromium layer is the multilayer film situated on the object side surface of the lens substrate.

3. Spectacles, which comprises the spectacle lenses according to claim 2.

4. The spectacle lens according to claim 2,
wherein the average reflectance in the wavelength region of a wavelength of 400 to 500 nm measured at the object side surface of the spectacle lens is 2.00% or less.

5. Spectacles, which comprises the spectacle lenses according to claim 1.

6. The spectacle lens according to claim 1,
wherein the average reflectance in the wavelength region of a wavelength of 400 to 500 nm measured at the object side surface of the spectacle lens is 2.00% or less.

\* \* \* \* \*